UNITED STATES PATENT OFFICE.

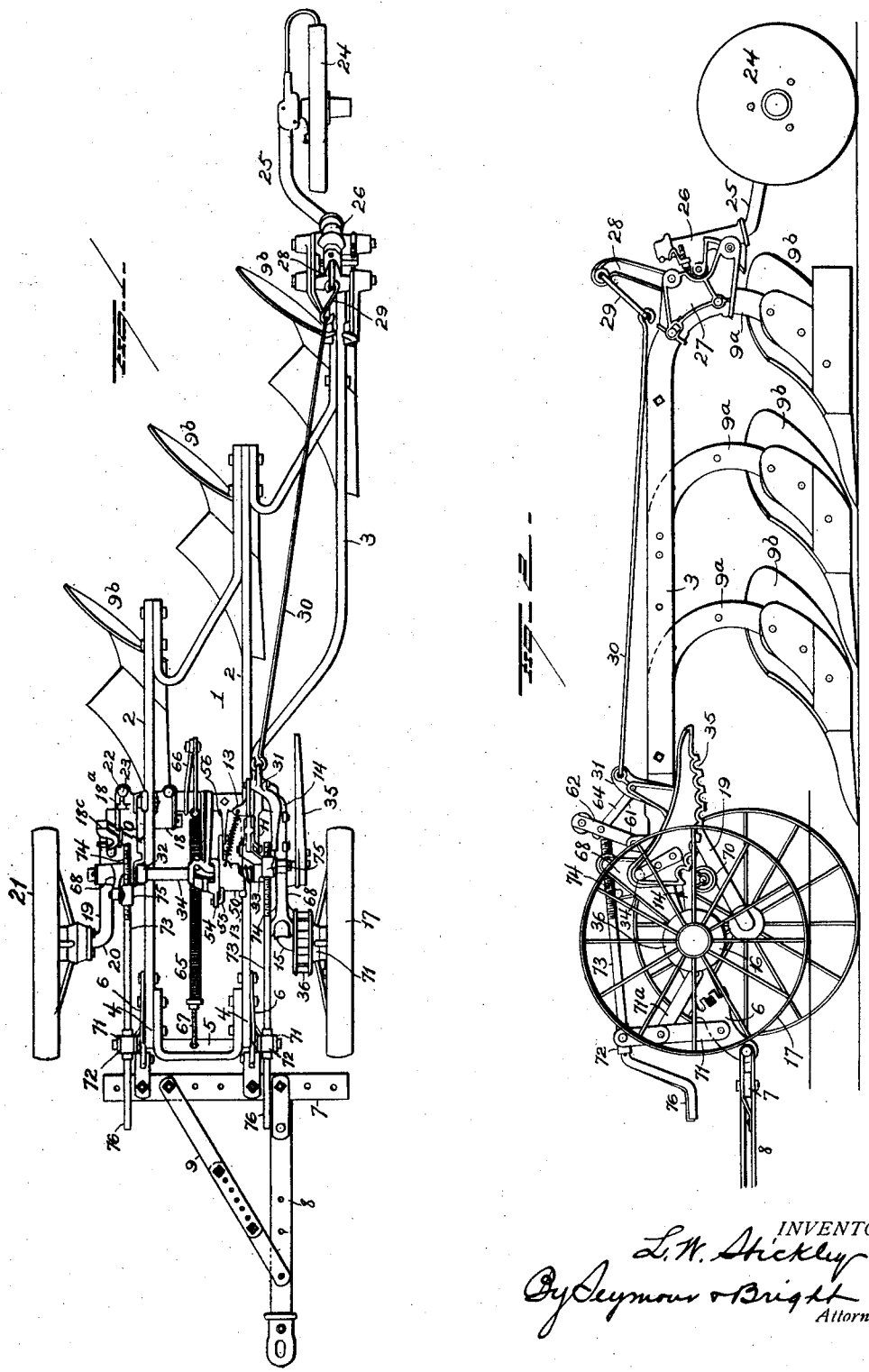

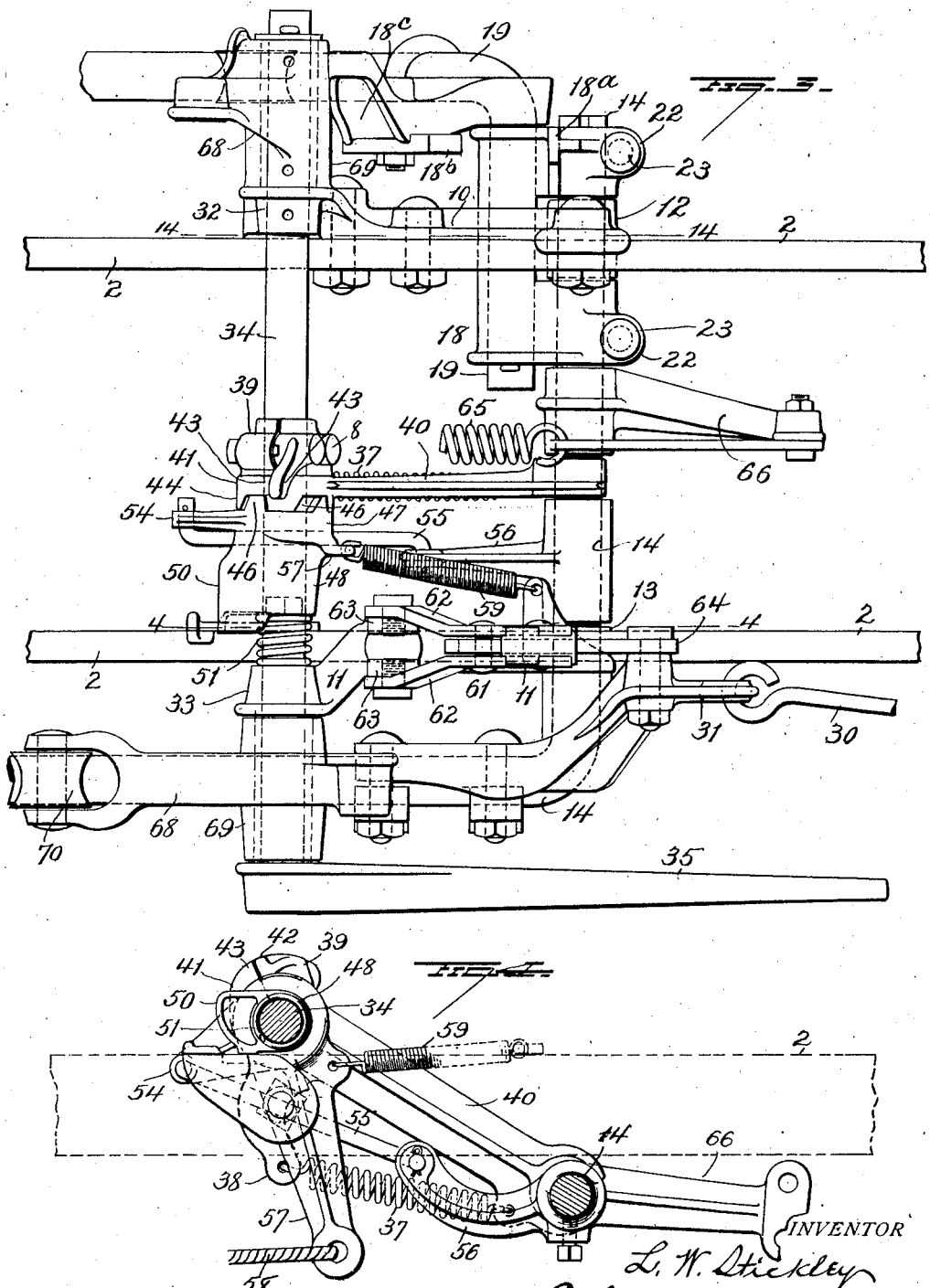

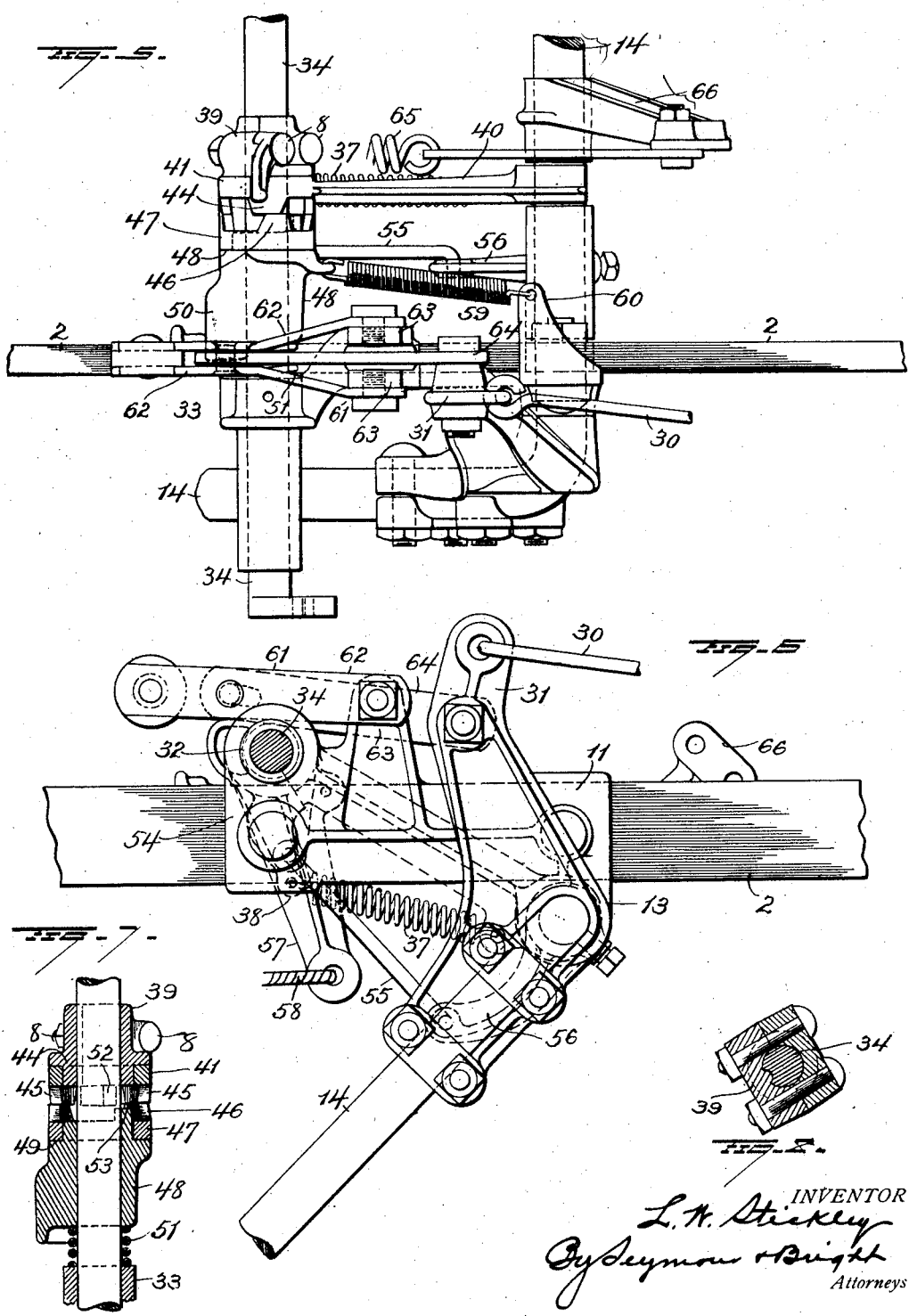

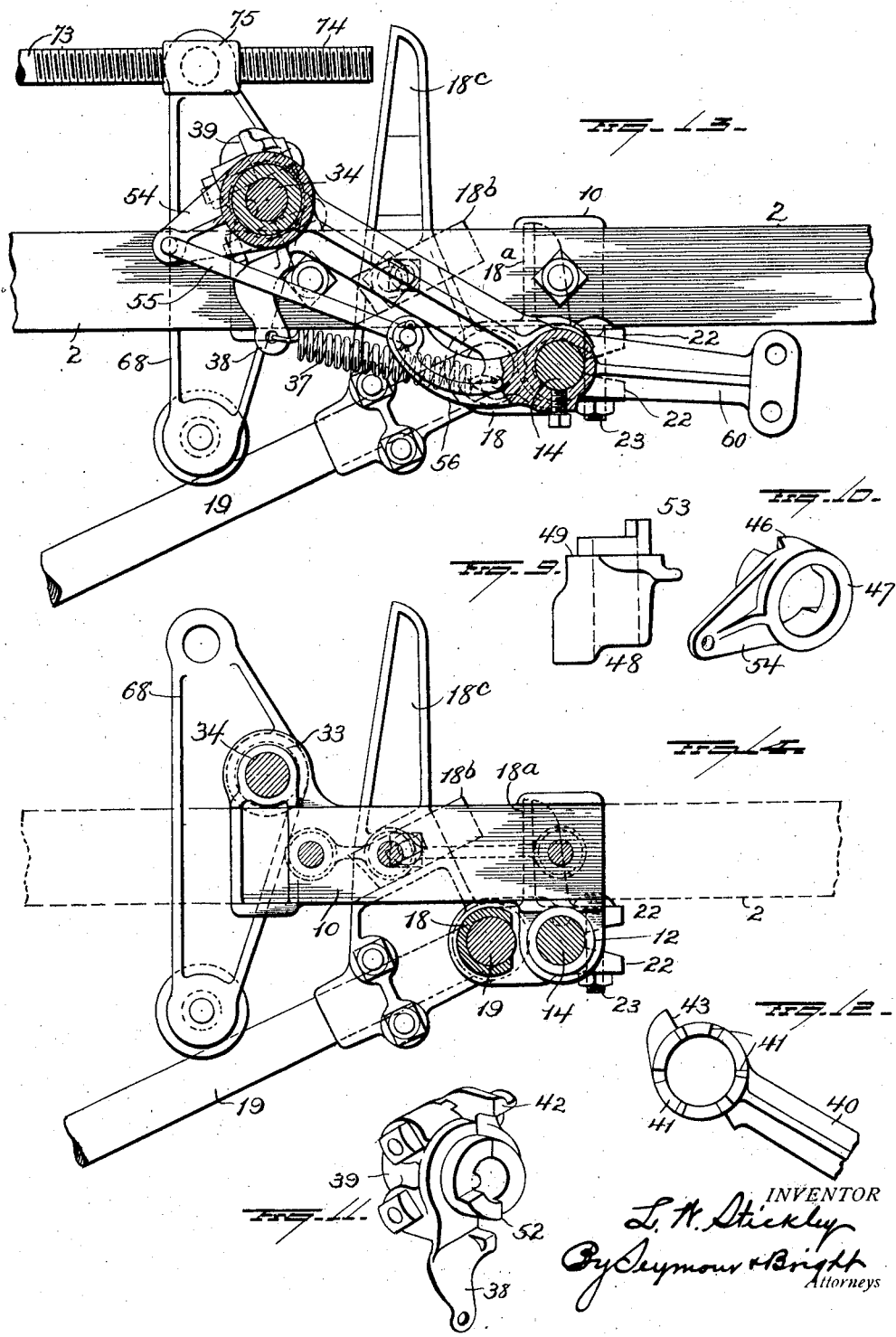

LLOYD WELCOME STICKLEY, OF SOUTH BEND, INDIANA, ASSIGNOR TO OLIVER CHILLED PLOW WORKS, OF SOUTH BEND, INDIANA.

PLOW.

1,345,275.  Specification of Letters Patent.  Patented June 29, 1920.

Application filed October 17, 1919. Serial No. 331,302.

*To all whom it may concern:*

Be it known that I, LLOYD W. STICKLEY, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as are intended to be "tractor-drawn,"—the invention being embodied, in the present instance, in a plow structure especially well adapted for use in plowing in orchards, said structure being "low-down," with no upwardly projecting levers which might conflict with limbs of trees, and with the land wheel located inside of the line of travel of the plow bases and with the hubs of said wheels inside of the plane of the outer edges of the rim portions of the wheels.

The object of my present invention is to provide a plow with wheel-operated lift mechanism which shall be simple in construction and which shall embody tripping mechanism for controlling the lifting and lowering of the plow, which shall comprise but few parts; be accurate in operation; which will not be liable to get out of order and which shall be easy and simple to manipulate and control.

With this and other objects in view, the invention consists in certain novel features of construction and combinations of parts as hereinafter set forth and pointed out in the claims.

In the accompanying drawings; Figure 1 is a plan view of a plow structure showing an embodiment of my invention; Fig. 2 is a side elevation; Fig. 3 is an enlarged plan view showing the controlling means of the power lift mechanism, and adjusting devices; Fig. 4 is a section on the line 4—4 of Fig. 3 with certain parts omitted; Fig. 5 is a partial plan view showing the positions of the trip and locking-up devices when the plow has been raised; Fig. 6 is an elevation, partly in section, of the structure shown in Fig. 5; Fig. 7 is a sectional view showing the cam and clutch devices; Fig. 8 is a section on the line 8—8 of Fig. 5; Figs. 9, 10, 11 and 12 are detail views showing the cam and clutch devices; Fig. 13 is a section on the line 13—13 of Fig. 1, and Fig. 14 is a section on the line 14—14 of Fig. 3.

1 represents a plow frame which comprises a plurality of plow beams 2—2 and 3 suitably spaced apart and braced and the two beams 2—2 are bent downwardly at their forward ends, as at 4 and connected by a cross bar 5. Clevises 6 are adjustably connected with the forward ends of the beams 2—2 and with these clevises, a hitch bar 7 is connected,—said hitch bar having adjustably connected therewith, a draw bar 8 for connection with a tractor and a brace 9 for said draw bar. The several beams 2—3 are provided with standard portions $9^a$ to which plow bases $9^b$ are secured.

Brackets 10—11 are bolted to the respective beams 2—2 and provided with bearings 12, 13 for a land-wheel crank-axle 14,—the crank of the latter having a spindle 15 on which the hub 16 of a land wheel 17 is mounted. A sleeve 18 constitutes a bearing for the furrow wheel crank axle 19,—the latter being provided with a spindle portion 20 on which the hub of the furrow wheel 21 is mounted,—said bearing sleeve being provided with lugs 22 keyed to the land-wheel-axle 14 and clamped thereto by means of bolts 23.

The lifting mechanism hereinafter described coöperates with the land wheel and its crank axle and as the furrow-wheel axle is mounted independently of the land-wheel axle, it is necessary that a connection shall be effected between these axles which will cause movement of both axles during the operation of raising the plow frame. In the present instance, the bearing sleeve 18 which is clamped and keyed to the crank axle 14 is provided with an arm $18^a$ and this arm engages a member $18^b$ adjustably secured to an arm $18^c$ rigidly attached to the furrow wheel crank axle 19.

The rear end of the structure is supported by a follower wheel 24,—the standard axle 25 of which is mounted in a bearing bracket 26 and the latter is pivoted to a bracket 27 secured to the rear end portion of the rear plow beam or the standard portion $9^a$ thereof. A lever 28, pivoted between its ends to the bracket 27, coöperates with the pivoted bearing bracket 26 to raise the rear end of the plow structure on the follower wheel 24, and in order that the rear end of the structure shall be raised through the medium of the same mechanism which effects the raising of the forward part of the structure (as hereinafter described), the lever 28 is connected, through the medium of a link 29 and a rod 30, with an arm 31 rigidly secured to the land-wheel-axle 14.

The brackets 10 and 11 are provided at their forward ends with bearings 32—33 for a shaft 34 disposed transversely over the beams 2—2 of the plow frame and projecting outwardly beyond each of said beams. At the projecting end of the shaft 34 nearest the land-side of the plow, a segmental rack 35 is secured and the hub 16 of the land wheel 17 has secured thereto, a gear or cage-wheel 36 with which said segmental rack will be caused to mesh to effect the raising of the plow frame. The segmental rack 35 will be maintained normally in an approximately horizontal position, as shown in Fig. 2, by means of a spring 37. One end of the spring 37 is connected with an arm 38 on a sleeve 39 secured to and movable with the shaft 34, and the other end of this spring is connected with an arm 40. The rear end of the arm 40 (with which the spring 37 is connected) is bifurcated and straddles the axle 14 and the forward end of this arm is provided with a ring or collar 41 mounted on one end of the sleeve 39 and within which said sleeve may turn freely. In order to limit the movement of the sleeve 39 and shaft 34 when the latter turns in a direction to raise the toothed segment, said sleeve is provided with a stop lug 42 to engage a stop lug 43 on the ring or collar 41. In this way the upward movement of the segment will be limited.

The sleeve 39 and ring or collar 41 constitute parts of the trip mechanism whereby the raising and lowering of the plow frame may be controlled. The ring or collar 41 is provided with lugs 44 having cam faces 45 and these cam lugs are adapted to coöperate with similar cam lugs 46 on a ring or collar 47 mounted freely on one end of a sleeve 48, the latter being located freely on the shaft 34 and provided with an annular shoulder 49 against which said ring or collar 47 abuts. Thus it will be seen that the parts 41 and 47 constitute coöperating cam rings. The sleeve 48 is made with a lateral enlargement forming an elongated arm or "kicking-off" cam 50 and a spring 51, located between said sleeve and the bearing 33 on the bracket 11 tends to force the sleeve in a direction to press the cam ring 47 toward the cam ring 41. The sleeve 39 is provided at one end with a clutch lug 52 and the sleeve 48 is provided with a clutch lug 53 to coöperate therewith and these clutch lugs are retained normally in coöperative relation to each other by the action of the spring 51. The cam ring 47 is provided with an arm 54 with which one end of a link 55 is connected, the other end of said link being connected with an arm 56 secured to the crank axle 14. The sleeve 48 is provided with an arm or lever 57 with which an operating cord 58 is connected. One end of a spring 59 is connected with the operating arm 57 and at its other end, this spring is connected with an arm 60 on the bracket 11,—said spring operating to hold the arm 57 and sleeve 48 in and return them to normal position.

It will be observed that the cam ring 41 is fixed; that the cam ring 47 can turn on its mounting on the sleeve 48; that the sleeve 48 can turn on the shaft 34; that said sleeve 48 and cam ring 47 are movable together longitudinally of said shaft, and that the sleeve 39 is fixed to the shaft 34. With such construction; if the sleeve 48 be turned in one direction, the clutch lug 53 thereon will coöperate with the clutch lug 52 on the fixed sleeve 39, and cause the shaft 34 to turn. When, by a pull on the cord 58, the shaft 34 is caused to turn as above described, the segmental rack 35 will be lowered into mesh with the gear or cage wheel 36 on the hub of the land wheel 17 and as the plow moves forwardly, motion will be imparted from said land wheel, through the medium of the gear 36 and segment 35 to the plow frame to raise the latter. During the upward movement of the plow frame, the carrying wheels will tend to move rearwardly and consequently the crank axle 14 will be caused to turn and motion will therefore be imparted, through the medium of the arms 54, 56 and link 55, to the cam ring 47 for turning the latter. As the cam ring 47 is thus turned, its cam lugs will coöperate with the cam lugs on the cam ring 41 and result in causing the cam ring 47 and the sleeve 48 on which it is mounted, to move longitudinally of the shaft 34, and the ends of the cam lugs on the ring 47 to become disposed against the ends of the cam lugs on the ring 41, as shown in Fig. 5. When the sleeve 48 is moved longitudinally of the shaft as above explained, the clutch lug thereon will be withdrawn from coöperative relation to the clutch lug on the sleeve 39, and the segment will be raised by the action of the spring 37.

When the plow frame shall have been raised as above described, it will be held in elevated position by the operation of a locking-up device 61. This device comprises links 62 secured together at one end and pivoted at their other ends to lugs 63 on the bracket 11, and a link 64 having a movable connection at one end with the links 62, (between the ends of the latter) and pivoted at its other end to the arm 31, which latter is, as before stated, secured to the crank axle 14. When the plow frame shall have been raised, the locking-up device will drop and overlie the "kicking-off" cam 50 of the sleeve 48 and the link 64 of said locking-up device will drop between the lugs 63 on bracket 11, so that the pivotal connection of the link 64 with the links 62 will be in line with the pivotal connection of said link 64 with the arm 31 on the crank axle 14, thus forming a "dead-center lock" to hold the plow in elevated position.

Assuming now, that it is desired to lower the plow frame, the operator will pull the cord 58 and thus cause the sleeve 48 to turn and the "kicking-off" cam formed on said sleeve to raise the locking-up device sufficiently to break the dead center, when the plow beam frame will drop by gravity. As the plow frame descends, the crank axle 14 will be caused to turn and motion will be transmitted, through the arms 54, 56 and link 55 to the cam ring 47, to turn the latter and move its lugs out of line with the lugs of the cam ring 41, when the members of the trip devices will be moved to coöperative relation by the action of the spring 51.

It will be observed that the lifting devices above described effect the raising of the forward portion of the plow frame, but during the raising operation, the turning of the crank axle 14 will cause motion to be transmitted, through the medium of the arm 31, rod 30 and link 29, to the lever 28 and the coöperation of the latter with the pivoted bearing bracket 26, will cause such movement of the standard axle 25 as to effect the raising of the rear end of the plow frame on the follower wheel 24. When the forward portion of the plow frame is dropped as previously explained, the arm 31 on the crank axle 14 will move in the reverse direction, and the dropping of the rear part of the frame will be permitted, as will be readily understood.

The plow structure may be provided with a balancing or lifting spring 65, one end of which is attached to an arm 66 secured to the crank axle 14 and the other end is adjustably connected, through the medium of a threaded rod 67 with the cross bar 5 at the forward end of the plow frame.

For the purpose of adjusting the plow for depth of plowing, the devices now to be described may be employed: Levers 68, 68 are provided between their ends with hub portions 69 loosely mounted on the bearings of the projecting portions of the shaft 34 and these levers carry rollers 70 at their lower ends to engage the cranks of the axles 14 and 19. Standards 71 are secured to the forward portion of the plow frame, (preferably to the clevices 6) and braced, as at 71ª. Sleeves 72 are swiveled or pivotally connected to the upper ends of said standards and shafts 73 pass through these sleeves. The shafts 73 are mounted to turn freely in the sleeves 72 but are prevented from moving longitudinally therethrough, and said shafts are provided with threaded portions 74 and pass through threaded sleeves 75 swiveled or pivotally connected with the upper ends of the levers 68. At their forward ends, the shafts 73 are provided with cranks 76 to facilitate their manual manipulation. It is apparent that by turning the shafts 73, the levers 68 may be so moved that their coöperation with the crank axles will effect such adjustment of the latter relatively to the plow frame as to regulate the depth at which the plow bases may enter the ground.

The arm 18ª (which is, in effect keyed to the crank axle 14); the member 18ᵇ, and the arm 18ᶜ on the furrow wheel crank axle 19, constitute, in addition to the functions hereinbefore mentioned, stop devices. The arm 18ᶜ is of sufficient length to engage the hub of the lever 68 at the furrow side of the plow, and prevent the furrow wheel from "kicking-back" in passing over an obstruction when the plow is in raised position and thus insure the maintenance of the axis of the furrow wheel in advance of the axis of the furrow wheel axle 19, as otherwise the plow could not be caused to drop.

By adjusting the member 18ᵇ, the plow may be leveled, when it is desired to set the furrow wheel higher or lower relatively to the land wheel so as to permit the furrow wheel to run on the mound thrown up when a previous mound has been made.

I do not claim herein the features for effecting depth adjustment, the same being subject matter of application for patent filed by E. M. Heylman, October 17, 1919, Serial No. 331,288; nor the construction including independently-movable crank axles, the same being embodied in application filed by E. M. Heylman Feb. 7, 1919, Serial No. 275,583; nor the means in a plow structure having two independently movable crank axles, to limiting the "kicking-back" of one of the crank axles and the devices for adjusting the furrow wheel, the same being embodied in application filed by E. M. Heylman and A. D. Gallagher Oct. 17, 1919, Serial No. 331,290.

Having fully described my invention what I claim as new and desire to secure by Letters-Patent, is:—

1. The combination with a wheeled plow frame, of a shaft mounted thereon, means coöperable with said shaft and with a wheel of the wheeled frame to raise the latter, trip mechanism on said shaft, said trip mechanism comprising a lever, clutch devices between said lever and the shaft, cam devices and means for operating said cam devices to control the opening and closing of the clutch devices.

2. The combination with a wheeled plow frame, a gear rotatable with one of the wheels, a shaft mounted on the frame, and a rack secured to said shaft for coöperation with said gear, of trip mechanism on said shaft, said trip mechanism comprising a lever, clutch devices between said lever and the shaft, cam devices on said shaft, and means for operating said cam devices to control the opening and closing of the clutch devices.

3. The combination with a plow frame, wheels therefor, and a crank axle, of a shaft mounted on the frame, means coöperable with said shaft and one of the wheels to raise the frame, trip mechanism on said shaft, said trip mechanism comprising a lever, clutch devices between said lever and said shaft, cam devices, and means connecting one member of said cam devices with the crank axle for operating said member to control the opening or closing of the clutch devices when the plow frame is raised or lowered.

4. The combination with a plow frame, wheels, and a crank axle, of a shaft mounted on said frame, a gear carried by one of said wheels, a segment for coöperation with said gear, secured to said shaft, a lever mounted on said shaft, clutch devices between said lever and the shaft, cam devices on the shaft for opening and closing said clutch devices, connections between one member of said cam devices and the crank axle for operating said member when the plow frame is raised or lowered, and a spring tending to force the members of said clutch devices and the members of the cam devices into coöperative relation.

5. The combination with a wheeled plow frame, of a shaft mounted thereon, means coöperable with said shaft and with a wheel of the wheeled frame to raise the latter, said means comprising a gear carried by said wheel and a segment secured to the shaft, a spring tending to turn said shaft in one direction normally to hold the segment in a position out of mesh with the gear and to return the segment to such position, a lever mounted on said shaft, clutch devices between said lever and shaft, cam devices on said shaft for controlling the opening and closing of said clutch devices, and means for controlling the operation of said cam devices.

6. The combination with a plow frame, a crank axle, and wheels, of a shaft mounted on said frame, power lift means between said shaft and a wheel of the wheeled frame, tripping mechanism on said shaft for controlling said power lift means, said tripping mechanism comprising a clutch sleeve loose on the shaft and provided with an operating lever, a clutch sleeve rigid with the shaft and coöperable with the loose clutch sleeve, a spring tending to press the loose clutch sleeve toward the fixed clutch sleeve, a fixed cam ring encircling the shaft, a movable cam ring encircling the shaft, and means connecting the crank axle with the movable cam ring for turning the latter when the frame is raised or lowered to move the loose clutch sleeve out of coöperative relation with the rigid clutch sleeve or to permit the movable clutch sleeve to move into operative relation to said rigid clutch sleeve.

7. The combination with a plow frame, a crank axle, and wheels, of a shaft mounted on the plow frame, power lift means between said shaft and one of the wheels, tripping mechanism on said shaft for controlling said power lift means, said tripping mechanism comprising a clutch member fixed to the shaft, a movable clutch member, means for operating said movable member, cam devices between said clutch members, and means controlled by the turning of the crank axle when the plow frame is raised or lowered and connected with one of the cam devices for controlling the movement of the movable clutch member relatively to the clutch member which is fixed to the shaft.

8. The combination with a plow frame, a crank axle, and wheels, of a shaft mounted on the plow frame, power lift means between said shaft and one of said wheels, tripping mechanism on the shaft, said tripping mechanism comprising a movable clutch member loose on the shaft, a clutch member fixed to the shaft, coöperating cam members, one of said cam members being loose on the movable clutch member, means holding the other cam member from rotation with the shaft and the clutch member fixed to the latter, a spring tending to force the loose clutch member and the loose cam member toward the fixed clutch and cam members, means for turning the loose clutch member to effect the turning of the shaft in one direction, a spring for turning the shaft in the other direction, and connections between the crank axle and the loose cam member for turning the latter to effect movement of the movable clutch member relatively to the clutch member fixed to the shaft.

9. The combination with a plow frame, a crank axle, and wheels, of dead center locking-up devices connected with the crank axle and frame, power lift devices between the frame and one of the wheels, tripping mechanism for controlling the operation of said power lift devices, connections between the crank axle and said tripping mechanism for controlling the operation of the latter, said tripping mechanism including a manually operable member carrying a "kicking-off" cam to break the dead center of said locking-up devices when the plow is to be lowered.

10. The combination with a plow frame, a crank axle, and wheels, of a shaft mounted on the frame, a toothed segment secured to said shaft, a gear carried by one of the wheels for coöperation with said toothed segment, a sleeve loose on said shaft and constituting a movable clutch member, a spring pressing said sleeve in one direction, said sleeve having a part constituting a "kicking-off" cam, a sleeve secured to said shaft and constituting a fixed clutch member, cam members between said sleeves, operating means for one of said cam members connected with the crank axle, means for turning said first-mentioned sleeve, and dead-center locking-up devices connected with the crank axle and with the frame and having a part projecting over the "kicking-off" cam when the plow frame is in raised position.

11. In a plow structure, the combination with a plow frame, two crank axles mounted near the forward portion of the frame, and wheels on said axles, of a shaft mounted on the frame, a toothed segment secured to said shaft, a gear on the adjacent wheel to coöperate with said toothed segment to raise the forward portion of the frame, an arm on one of said crank axles for connection of follower wheel lifting means, trip mechanism on said shaft, said trip mechanism comprising a lever, clutch devices between said lever and shaft and cam devices between the clutch devices, and operating connections between one member of said cam devices and one of said crank axles.

12. The combination with a wheeled plow frame, and a gear carried by one of the wheels, of a shaft mounted on the frame, a toothed segment secured to said shaft for coöperation with said gear, a sleeve secured to said shaft, manually operable means coöperable with said sleeve for turning the shaft to lower the segment, a spring connected at one end with said shaft and at the other end to a fixed part, a fixed ring encircling said shaft, a stop lug on said ring, and a stop lug on the sleeve to coöperate with the stop lug on the fixed ring for limiting the height to which the segment may be raised.

In testimony whereof, I have signed this specification in the presence of two subscribing witnesses.

LLOYD WELCOME STICKLEY.

Witnesses:
 EDWIN NICAR,
 GEORGE R. LANPHERE.